(12) United States Patent
Yi et al.

(10) Patent No.: US 11,927,868 B2
(45) Date of Patent: Mar. 12, 2024

(54) ELECTRO-OPTIC POLYMER DEVICES HAVING HIGH PERFORMANCE CLADDINGS, AND METHODS OF PREPARING THE SAME

(71) Applicant: Lightwave Logic, Inc., Englewood, CO (US)

(72) Inventors: Youngwoo Yi, Louisville, CO (US); Cory Steven Pecinovsky, Lafayette, CO (US); Michael Stephen Lebby, San Francisco, CA (US); Richard Anthony Becker, Cupertino, CA (US)

(73) Assignee: Lightwave Logic, Inc., Englewood, CO (US)

( * ) Notice: Subject to any disclaimer, the term of this patent is extended or adjusted under 35 U.S.C. 154(b) by 0 days.

(21) Appl. No.: 18/094,654

(22) Filed: Jan. 9, 2023

(65) Prior Publication Data
US 2023/0251543 A1  Aug. 10, 2023

Related U.S. Application Data

(63) Continuation of application No. 16/573,257, filed on Sep. 17, 2019, now Pat. No. 11,614,670.

(Continued)

(51) Int. Cl.
*G02F 1/361* (2006.01)
*G02B 1/04* (2006.01)
(Continued)

(52) U.S. Cl.
CPC ............ *G02F 1/166* (2019.01); *G02B 1/046* (2013.01); *G02B 1/048* (2013.01); *G02F 1/3611* (2013.01);
(Continued)

(58) Field of Classification Search
CPC ............................. G02F 1/3616; G02F 1/3617
See application file for complete search history.

(56) References Cited

U.S. PATENT DOCUMENTS

| 4,767,169 A | 8/1988 | Teng et al. |
| 4,795,664 A | 1/1989 | Demartino |

(Continued)

FOREIGN PATENT DOCUMENTS

| WO | 03003102 A2 | 1/2003 |
| WO | 2012037377 A2 | 3/2012 |

OTHER PUBLICATIONS

Zhang et al., "Enhanced Nonlinear Optical Activity of Molecules Containing Two D-π-A Chromophores Locked Parallel to Each Other", Chem. Mater. 2008, 20, 4628-4641. (Year: 2008).*

(Continued)

*Primary Examiner* — Charlie Y Peng
(74) *Attorney, Agent, or Firm* — FLASTER GREENBERG P.C.

(57) ABSTRACT

Electro-optic (EO) devices having an EO polymer core comprising a first host polymer and a first nonlinear optical chromophore (NLOC); and a cladding comprising a second host polymer and a second NLOC, and methods of preparing the same; wherein the first NLOC has a first bridge covalently bonded to an electron-accepting group and an electron-donating group; wherein the second NLOC has a second bridge covalently bonded to an electron-accepting group and an electron-donating group; and wherein the second bridge is less conjugated than the first bridge such that the cladding has an index of refraction that is less than that of the EO polymer core, and wherein the second NLOC is present in the second host polymer in a concentration such (Continued)

that the cladding has a conductivity equal to or greater than at least 10% of the conductivity of the EO polymer core at a poling temperature.

11 Claims, 5 Drawing Sheets

Related U.S. Application Data

(60) Provisional application No. 62/732,143, filed on Sep. 17, 2018.

(51) Int. Cl.
*G02F 1/166* (2019.01)
*G02F 1/365* (2006.01)

(52) U.S. Cl.
CPC .......... *G02F 1/3614* (2013.01); *G02F 1/3617* (2013.01); *G02F 1/365* (2013.01); *G02F 2202/022* (2013.01)

(56) References Cited

U.S. PATENT DOCUMENTS

| | | | |
|---|---|---|---|
| 4,810,338 | A | 3/1989 | Demartino et al. |
| 4,936,645 | A | 6/1990 | Yoon et al. |
| 5,006,285 | A | 4/1991 | Thackara et al. |
| 5,044,725 | A | 9/1991 | Demartino et al. |
| 5,106,211 | A | 4/1992 | Chiang et al. |
| 5,133,037 | A | 7/1992 | Yoon et al. |
| 5,170,461 | A | 12/1992 | Yoon et al. |
| 5,187,234 | A | 2/1993 | Leslie et al. |
| 5,196,509 | A | 3/1993 | Allen |
| 5,247,042 | A | 9/1993 | Allen et al. |
| 5,326,661 | A | 7/1994 | Sansone et al. |
| 6,393,190 | B1 | 5/2002 | He et al. |
| 6,444,830 | B1 | 9/2002 | He et al. |
| 6,448,416 | B1 | 9/2002 | He et al. |
| 6,514,434 | B1 | 2/2003 | He et al. |
| 6,584,266 | B1 | 6/2003 | He et al. |
| 6,716,995 | B2 | 4/2004 | Huang et al. |
| 7,346,259 | B1 | 3/2008 | Jen et al. |
| 7,408,693 | B2 | 8/2008 | Kissa et al. |
| 8,934,741 | B2 | 1/2015 | Chen et al. |
| 2007/0260062 | A1 | 11/2007 | Goetz et al. |
| 2007/0260063 | A1 | 11/2007 | Goetz et al. |
| 2008/0004415 | A1* | 1/2008 | McGinniss ........... C07C 205/45 548/366.1 |
| 2008/0009620 | A1 | 1/2008 | Goetz et al. |
| 2008/0139812 | A1 | 6/2008 | Goetz et al. |
| 2009/0005561 | A1 | 1/2009 | Goetz et al. |
| 2009/0118521 | A1* | 5/2009 | Jen ....................... C07D 307/56 427/457 |
| 2012/0267583 | A1 | 10/2012 | Goetz, Jr. et al. |
| 2015/0346521 | A1 | 12/2015 | Williams |
| 2018/0259798 | A1 | 9/2018 | Becker et al. |

OTHER PUBLICATIONS

Seong-Ku Kim, H. Zhang, D. H. Chang, et al., Electrooptic Polymer Modulators With an Inverted-Rib Waveguide Structure, IEEE Photonics Technology Letters, Feb. 2003, vol. 15, No. 2, at 218-220.

Youngqiang Shi, Weiping Lin, David J. Olson, et al., Electro-optic polymer modulators with 0.8 V half-wave voltage, Applied Physics Letters, Jun. 28, 2000, vol. 77, No. 1, at 1-3.

H. Chen, B. Chen, D. Huang, et al., Broadband electro-optic polymer modulators with high electro-optic activity and low poling optical loss, Applied Physics Letters, Jul. 29, 2008, vol. 93, at 043507.

David Eng, "Organic-Based Electro-Optic Modulators for Microwave Photonic Applications," Ph.D. Thesis, University of Delaware, 2015.

Chia-Chi Teng, Measuring Electro-Optic Constants of a Poled Film, in Nonlinear Optics of Organic Molecules and Polymers, Chp. 7, at 447-49 (Hari Singh Nalwa & Seizo Miyata eds., 1997).

C. W. Thiel, "For-wave Mixing and Its Applications," http://www.physics.montana.edu.students.thiel.docs/FWMixing.pdf, 2008, at 1-20.

R. Ulrich and R. Torge, "Measurement of Thin Film Parameters with a Prism Coupler," Applied Optics, Dec. 1973, vol. 12, No. 12, at 2901-2908.

* cited by examiner

Control of the Index of Refraction of the Claddings by Chromophore Concentration

ELECTRO-OPTIC POLYMER DEVICES HAVING HIGH PERFORMANCE CLADDINGS, AND METHODS OF PREPARING THE SAME

CROSS-REFERENCE TO RELATED APPLICATIONS

This application is a continuation of U.S. Non-Provisional application Ser. No. 16/573,257, filed on Sep. 17, 2019, which claims benefit under 35 U.S.C. § 119(e) of U.S. Provisional Patent Application No. 62/732,143, filed on Sep. 17, 2018, the entire contents of which are incorporated herein by reference.

BACKGROUND OF THE INVENTION

Electro-optic polymer devices include, for example, waveguides and modulators. Electro-optic polymer devices and the use of organic second order nonlinear optical polymers in such devices is well documented. A typical electro-optic polymer modulator can comprise: 1) an electro-optic polymer core; 2) a first polymer cladding overlying the electro-optic polymer core; 3) a second polymer cladding underlying the electro-optic polymer core; 4) a top electrode overlying the first polymer cladding; 5) a bottom electrode underlying the second polymer cladding; and 6) a substrate such as silicon. In a typical electro-optic polymer device, the total thickness of the core, first cladding, and second cladding can be around 6-10 m. Typically, the refractive indices of the polymer clads are chosen to confine a great majority of the optical field in the electro-optic polymer core and keep the optical field from contacting the metal electrodes.

Thin film electro-optic polymer devices generally comprise multiple adjacent thin films that can be formed by, for example, spin coating. In the production of thin film electro-optic polymer devices, it can be desirable to build successive layers of material with slightly different optical properties, such as refractive indices, in order to tailor the optical properties of the particular device. The refractive index of a core layer must be higher than the refractive index of cladding layers so that the optical modes can be conducted into the core layer by internal reflection.

Thereafter, a poling process is carried out to align the electro-optic polymers in the core. Poling processes include the application of heat to soften the polymer host of the core layer and the application of a voltage across the device, such that the electro-optic polymers can be aligned.

Proper conductivity in the claddings of an electro-optic device during poling is also advantageous. The insulating properties of some polymers detract from their desirable use as claddings in electro-optic polymer devices because their low conductivities can result in the need for excessive voltage to be applied across the device.

Additionally, it is beneficial to have solvent compatibility and adherence between layers, along with matching of thermal expansion coefficients. Lastly, claddings should also exhibit low optical and RF loss.

Thus, it is desirable to provide electro-optic polymer devices having claddings which exhibit desirable conductivity at poling temperatures, indices of refraction lower than the core, low optical loss, low RF loss, solvent compatibility, thermal expansion coefficient matching and good adherence between layers.

BRIEF SUMMARY OF THE INVENTION

The present invention is directed, in general, electro-optic polymer devices. More particularly, the present invention is directed to electro-optic polymer devices having claddings with high performance and methods of preparing such devices and cladding layers. Various embodiments of the present invention provide claddings for electro-optic polymer devices (e.g., waveguides, modulators, etc.) with significantly improved performance, including low optical loss, low RF loss, solvent compatibility, thermal expansion coefficient matching and good adherence between layers, in conjunction with the requisite difference in index of refraction and excellent conductivity at poling temperatures. More specifically, various embodiments of the present invention provide claddings which have a conductivity greater than or equal to at least 10% of the conductivity of the electro-optic core material or in various embodiments greater than or equal to the conductivity of the electro-optic core material at a poling temperature, thus providing for efficient poling across the core without applying an excessively high voltage across the device, and simultaneously, an index of refraction suitable for a single mode device.

One embodiment of the present invention includes an electro-optic device comprising: (i) an electro-optic polymer core comprising a first host polymer and a first nonlinear optical chromophore; and (ii) a cladding comprising a second host polymer and a second nonlinear optical chromophore; wherein the first nonlinear optical chromophore has a structure according to the general formula (I):

$$D\text{-}\Pi\text{-}A \qquad (I)$$

wherein D represents a first organic electron-donating group; A represents a first organic electron-accepting group having an electron affinity greater than the electron affinity of D; and Π represents a first bridge covalently bonded to A and D; wherein the second nonlinear optical chromophore has a structure according to the general formula (II):

$$D'\text{-}\Pi'\text{-}A' \qquad (II)$$

wherein D' represents a second organic electron-donating group; A' represents a second organic electron-accepting group having an electron affinity greater than the electron affinity of D'; and Π' represents a second bridge covalently bonded to A' and D'; and wherein the cladding has an index of refraction that is less than an index of refraction of the electro-optic polymer core, and wherein the second nonlinear optical chromophore is present in the second host polymer in a concentration such that the cladding has a conductivity equal to or greater than at least 10% of the conductivity of the electro-optic polymer core at a poling temperature.

Another embodiment of the present invention includes an electro-optic device comprising: (i) an electro-optic polymer core comprising a first host polymer and a first nonlinear optical chromophore; and (ii) a cladding comprising a second host polymer and a second nonlinear optical chromophore; wherein the first nonlinear optical chromophore has a structure according to the general formula (I):

$$D\text{-}\Pi\text{-}A \qquad (I)$$

wherein D represents a first organic electron-donating group; A represents a first organic electron-accepting group having an electron affinity greater than the electron affinity of D; and Π represents a first bridge covalently bonded to A and D; wherein the second nonlinear optical chromophore has a structure according to the general formula (II):

$$D'\text{-}\Pi'\text{-}A' \qquad (II)$$

wherein D' represents a second organic electron-donating group which is the same as D; A' represents a second organic electron-accepting group which is the same as A and has an electron affinity greater than the electron affinity of D'; and Π' represents a second bridge covalently bonded to A' and D'; and wherein the second bridge is less conjugated than the first bridge such that the cladding has an index of refraction that is less than an index of refraction of the electro-optic polymer core, and wherein the second nonlinear optical chromophore is present in the second host polymer in a concentration such that the cladding has a conductivity equal to or greater than at least 10% of the conductivity of the electro-optic polymer core at a poling temperature.

In various embodiments of the present invention, the cladding comprises an upper cladding and a lower cladding, wherein the electro-optic polymer core is disposed between the lower cladding and the upper cladding, wherein the lower cladding comprises the second host polymer and the second nonlinear optical chromophore and the upper cladding comprises a third host polymer and a third nonlinear optical chromophore; wherein the third nonlinear optical chromophore has a structure according to the general formula (III):

$$D''\text{-}\Pi''\text{-}A'' \qquad (III)$$

wherein D" represents a third organic electron-donating group; A" represents a third organic electron-accepting group having an electron affinity greater than the electron affinity of D"; and Π" represents a third bridge covalently bonded to A" and D"; wherein the upper cladding has an index of refraction that is less than an index of refraction of the electro-optic polymer core, and wherein the third nonlinear optical chromophore is present in the third host polymer in a concentration such that the cladding has a conductivity equal to or greater than at least 10% of the conductivity of the electro-optic polymer core at a poling temperature.

In various preferred embodiments of the present invention, the first host polymer, the second host polymer and the third host polymer are the same. In various preferred embodiments of the present invention, the claddings have a blue-shifted absorption spectrum as compared to the absorption spectrum of the electro-optic polymer core. Additionally, in various embodiments of the present invention, the second nonlinear optical chromophore and/or the third nonlinear optical chromophore can be present in the second host polymer and/or the third host polymer, respectively, in concentrations such that the respective cladding layer(s) has (have) a conductivity equal to or greater than at least 20% of the conductivity of the electro-optic polymer core at a poling temperature, and with increasing preference, a conductivity equal to or greater than at least 30%, ≥40%, ≥50%, ≥60%, ≥70%, ≥80%, ≥90%, or 100%, of the conductivity of the electro-optic polymer core at a poling temperature An exemplary first nonlinear optical chromophore suitable for use in accordance with the various embodiments of the present invention is represented by formula (Ia):

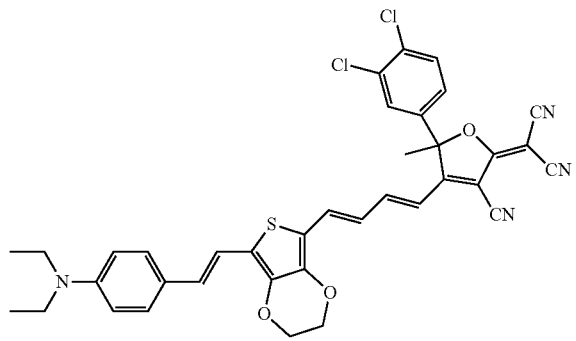

wherein the first bridge H is represented by the formula IVa:

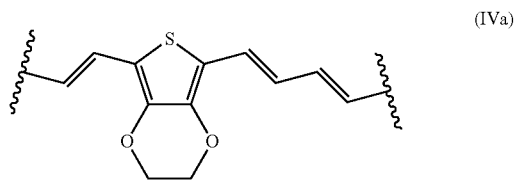

and the second and/or third bridges Π' and Π" are each independently represented by formula IVb or IVc:

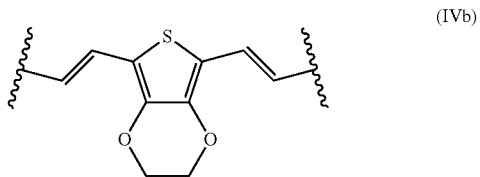

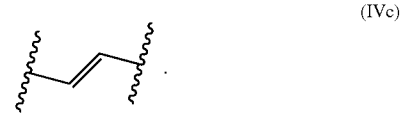

Still other various embodiments in accordance with the present invention include methods of preparing cladding materials for electro-optic devices, which methods comprise: (a) selecting a first nonlinear optical chromophore of the general formula (I):

$$D\text{-}\Pi\text{-}A \qquad (I)$$

wherein D represents a first organic electron-donating group; A represents a first organic electron-accepting group having an electron affinity greater than the electron affinity of D; and Π represents a first bridge covalently bonded to A and D; and dispersing a first amount of the first nonlinear optical chromophore in a first host polymer to form an electro-optic core material; (b) measuring an index of refraction of the electro-optic core material, and measuring a conductivity of the electro-optic core material at a poling temperature; (c) selecting a second nonlinear optical chromophore of the general formula (II):

$$D'\text{-}\Pi'\text{-}A' \qquad (II)$$

wherein D' represents a second organic electron-donating group, A' represents a second organic electron-accepting group having an electron affinity greater than the electron affinity of D', and Π' represents a second bridge covalently bonded to A' and D' and wherein the second bridge is less conjugated than the first bridge; (d) dispersing a second amount of the second nonlinear optical chromophore in a second host polymer to form an initial cladding material such that the second nonlinear optical chromophore is present in the second host polymer at the same concentration as the first nonlinear optical chromophore in the first host polymer; (e) measuring an index of refraction of the initial cladding material and a conductivity of the initial cladding material at the poling temperature; (f) confirming that the index of refraction of the initial cladding material is lower than the index of refraction of the electro-optic core material; and (g) adjusting the concentration of the second nonlinear optical chromophore in the second host polymer to form a final cladding material having a conductivity equal to or greater than at least 10% of the conductivity of the electro-optic core material at the poling temperature, while maintaining an index of refraction suitable for the specific mode(s) of a desired waveguide.

In various preferred embodiments of methods and devices of the present invention, D and D' are the same and A and A' are the same. In various preferred embodiments of methods and devices of the present invention wherein the cladding comprises a lower cladding and an upper cladding, D, D' and D" are the same and A, A' and A" are the same.

Other aspects, features and advantages will be apparent from the following disclosure, including the detailed description, preferred embodiments, and the appended claims.

BRIEF DESCRIPTION OF SEVERAL VIEWS OF THE DRAWINGS

The foregoing summary, as well as the following detailed description of preferred embodiments of the invention, will be better understood when read in conjunction with the appended drawings. For purposes of illustration only, there are shown in the drawings embodiments which are exemplary and in no way limiting. It should be understood, that the various embodiments of the invention are not limited to the precise arrangements and instrumentalities shown.

In the drawings.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a solvent" or "the solvent" herein or in the appended claims can refer to a single solvent or more than one solvent. Additionally, all numerical values, unless otherwise specifically noted, are understood to be modified by the word "about."

The present invention relates to electro-optic polymer devices comprising: an electro-optic core material, i.e., a host-guest system made of a host polymer (e.g., a polyetherimide) and a guest nonlinear optical chromophore, or multiple guest chromophores, or monolith of a chromophore, or a polymers with chromophores in their main chains or side chains; and a cladding according to various embodiments of the present invention. A nonlinear optical chromophore may also be referred to herein interchangeably and for brevity as simply "a chromophore." Electro-optic device and/or system embodiments of the present invention include phased array radar, satellite and fiber telecommunications, cable television (CATV), optical gyroscopes for application in aerial and missile guidance, electronic counter measure systems (ECM) systems, backplane interconnects for high-speed computation, ultrafast analog-to-digital conversion, land mine detection, radio frequency photonics, spatial light modulation, all-optical (light-switching-light) signal processing, solar conversion and photovoltaic devices, wherein such devices include an electro-optic core material and a cladding in accordance with one of the various embodiments of the present invention.

One example of an electro-optic device according to the present invention includes electro-optic modulators for telecommunications, wherein the modulator comprises an electro-optic core material and a cladding in accordance with one of the various embodiments of the present invention. Additional examples of electro-optic structures and devices which can employ cores and claddings in accordance with the various embodiments of the present invention are known and described throughout the literature, including for example, Seong-Ku Kim, H. Zhang, D. H. Chang, et al., Electrooptic Polymer Modulators With an Inverted-Rib Waveguide Structure, IEEE PHOTONICS TECHNOLOGY LETTERS, Vol. 15, No. 2, 218-220; Youngqiang Shi, Weiping Lin, David J. Olson, et al., Electro-optic polymer modulators with 0.8 V half-wave voltage, APPLIED PHYSICS LETTERS, Vol. 77, No 1, 1-3; H. Chen, B. Chen, D. Huang, et al., Broadband electro-optic polymer modulators with high electro-optic activity and low poling optical loss, APPLIED PHYSICS LETTERS, Vol. 93, 043507; and David Eng, "Organic-Based Electro-Optic Modulators for Microwave Photonic Applications," Ph.D. Thesis, University of Delaware, 2015, the entire contents of each of which is incorporated herein by reference.

Figure 1:
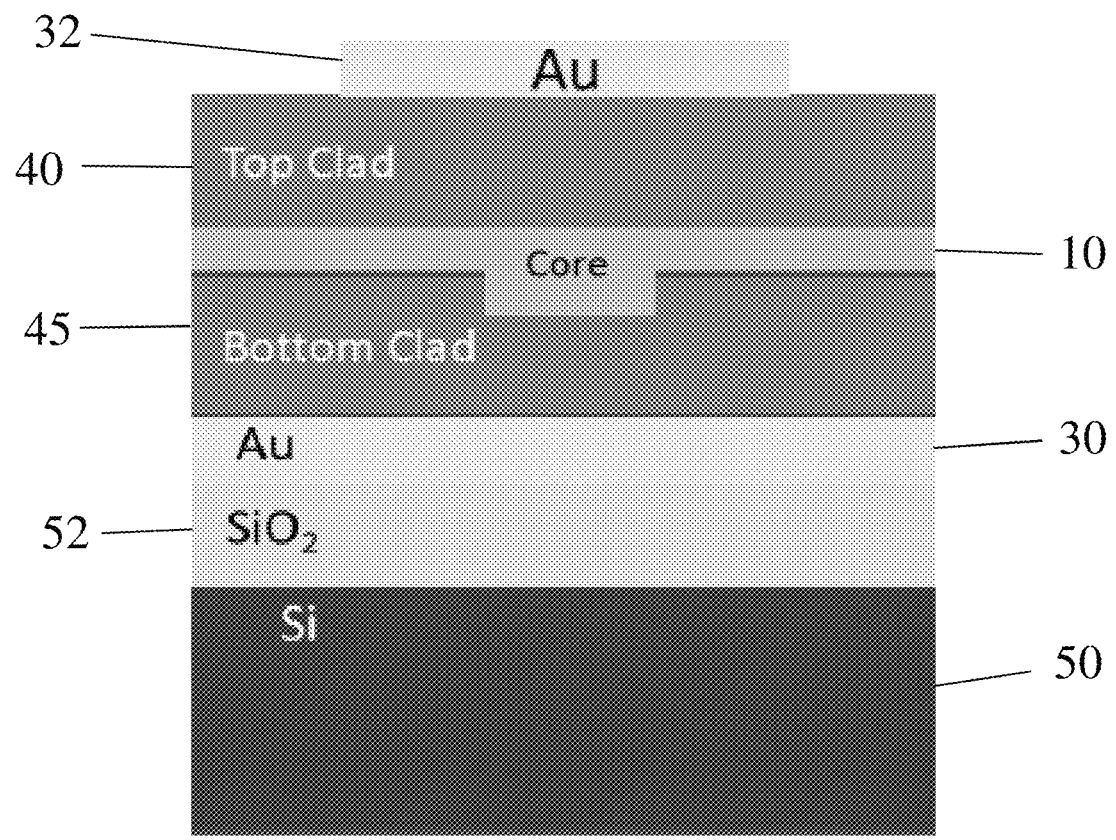
FIG. 1 is cross-sectional diagrammatic view of the general structure of an electro-optic polymer modulator.

Referring, for example to FIG. 1, the general structure of an electro-optic polymer modulator is depicted. An electro-optic core 10 with an optional central ridge can be sandwiched or interposed between an upper (or "top") cladding 40 and a lower (or "bottom") cladding 45. A lower (or "bottom") electrode 30 and an upper (or "top") electrode 32 are interposed by the lower cladding 45, electro-optic core 10, and upper cladding 40. The entire stack may be formed on a silicon wafer 50 or other suitable substrates such as GaAs, InP and other Group III-V materials such as GaN-on-Si, which substrates may also include an insulating layer 52, such as silicon dioxide.

Thus, for example, still referring to the general structure depicted in FIG. 1, in one embodiment according to the present invention, the core 10 comprises a first host polymer and a first nonlinear optical chromophore; and the top and bottom claddings 40, 45 comprise a second host polymer and a second nonlinear optical chromophore; wherein the first nonlinear optical chromophore has a structure according to the general formula (I):

D-Π-A　　　　　　　　　　　　　　　　(I)

wherein D represents a first organic electron-donating group; A represents a first organic electron-accepting group having an electron affinity greater than the electron affinity of D; and Π represents a first bridge covalently bonded to A and D; wherein the second nonlinear optical chromophore has a structure according to the general formula (II):

D'-Π'-A'　　　　　　　　　　　　　　　(II)

wherein D' represents a second organic electron-donating group which is the same as D; A' represents a second organic electron-accepting group which is the same as A and has an electron affinity greater than the electron affinity of D'; and Π' represents a second bridge covalently bonded to A' and D'; and wherein the second bridge is less conjugated than the first bridge such that the cladding has an index of refraction that is less than an index of refraction of the electro-optic polymer core, and wherein the second nonlinear optical chromophore is present in the second host polymer in a concentration such that the conductivity of the cladding is equal to or greater than the conductivity of the electro-optic polymer core at a poling temperature. In certain examples of various preferred embodiments of the present invention, the first and second host polymers are also the same.

Electro-optic devices in accordance with the various embodiments of the present invention can be prepared by numerous known processes of deposition, coating and patterning, including CVD, PECVD, sputtering, spin-coating, polishing, etching and metallization whereby each successive layer is deposited sequentially upon the starting substrate.

As used herein, the term "nonlinear optic chromophore" (NLOC) refers to molecules or portions of a molecule that create a nonlinear optic effect when irradiated with light. The chromophores are any molecular unit whose interaction with light gives rise to the nonlinear optical effect. The desired effect may occur at resonant or nonresonant wavelengths. The activity of a specific chromophore in a nonlinear optic material is stated as its hyper-polarizability, which is directly related to the molecular dipole moment of the chromophore. Thus, nonlinear optical chromophores suitable for use in core or cladding materials of the various embodiments according to the present invention include compounds containing an electron-donating group and an electron-accepting group covalently bonded to an intervening bridging group, or "bridge."

Suitable electron-accepting groups "A" (also referred to in the literature as electron-withdrawing groups) for nonlinear optical chromophores in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,716,995; 6,584,266; 6,393,190; 6,448,416; 6,44,830; 6,514,434; 5,044,725; 4,795,664; 5,247,042; 5,196,509; 4,810,338; 4,936,645; 4,767,169; 5,326,661; 5,187,234; 5,170,461; 5,133,037; 5,106,211; and 5,006,285; each of which is also incorporated herein by reference in its entirety.

In various nonlinear optical chromophores in accordance with various preferred embodiments of the present invention, suitable electron-accepting groups include those according to general formula (Va):

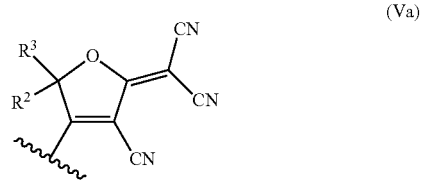

wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10. In various particularly preferred embodiments, the electron-accepting group is

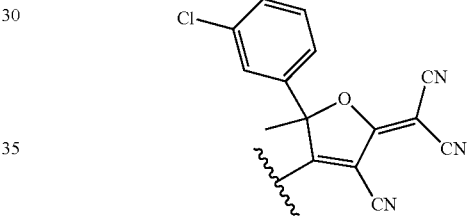

Suitable electron-donating groups "D" for nonlinear optical chromophores in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,716,995; 6,584,266; 6,393,190; 6,448,416; 6,44,830; 6,514,434; 5,044,725; 4,795,664; 5,247,042; 5,196,509; 4,810,338; 4,936,645; 4,767,169; 5,326,661; 5,187,234; 5,170,461; 5,133,037; 5,106,211; and 5,006,285; each of which is also incorporated herein by reference in its entirety.

Nonlinear optical chromophores according to the present invention can further comprise one or more pendant spacer groups bound the bridge, the electron-donating group and/or the electron-accepting group. Pendant spacer groups in accordance with the present invention are generally nonreactive moieties which extend outward from the chromophore and create steric hindrance (i.e., "spacing") between two or more of the chromophore molecules in a material containing the chromophores, and thus serve to prevent aggregation during and after poling.

Suitable bridges (1I) for nonlinear optical chromophores according to the various embodiments of the present invention are organic moieties containing charge-transporting groups and having at least one end capable of bonding to a D group and at least one end capable of bonding to an A group, and include those described in the previously incorporated references. Suitable charge-transporting groups include groups disclosed in, for example, Shirota and Kageyama, CHEM. REV. 2007, 107, 953-1010, the entire contents of which are hereby incorporated by reference herein, and include, for example, arylamines, in particular triarylamines; and heteroaromatics, including fused and oligomeric heteroaromatics such as oligothiophene or fused thiophenes, as well as phthalocyanine-based compounds, porphyrin-based compounds, azobenzene-based compounds, benzidine-based compounds, arylalkane-based compounds, aryl-substituted ethylene-based compounds, stilbene-based compounds, anthracene-based compounds, hydrazone-based compounds, quinone-based compounds, and fluorenone-based compounds.

In various preferred embodiments, bridging groups (1I) for nonlinear optical chromophores include those of the general formula (IV):

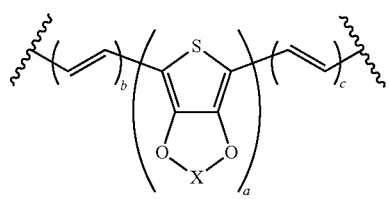

(IV)

wherein X represents a substituted or unsubstituted, branched or unbranched $C_2$-$C_4$ diyl moiety; wherein a represents an integer of from 0 to 3; and each of b and c independently represents an integer of from 0 to 5, more preferably 0 to 2; and with the proviso that a +b+c is equal to or greater than 1.

As used herein throughout this specification and in the appended claims, the phrase "less conjugated than" means, in the broadest sense, less extensive conjugation. More particularly, and in the various embodiments according to the present invention, "less conjugated than" means less conjugation, whether conjugation by virtue of alternating carbon-carbon double bonds or the presence of a heteroatom with a lone pair of electrons, along the shortest path between the electron-donating group and the electron-accepting group. Thus, for clarity and non-limiting exemplary purposes, the following bridge structures of Formulae $X^1$, $X^2$, and $X^3$ are all less conjugated than the bridge structure of Formula Y:

(Y)

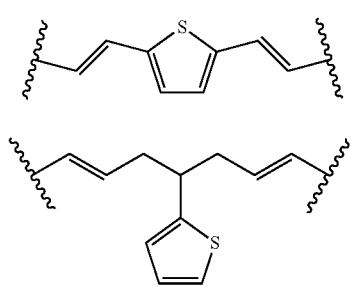

($X^1$)

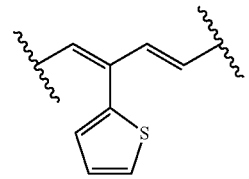

($X^2$)

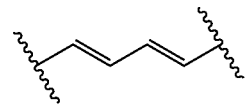

($X^3$)

That is, due to the presence of the thiophene ring and its sulfur heteroatom, Formula Y is more conjugated than the structures of Formulae $X^1$, $X^2$, and $X^3$, along the shortest path between the electron-donating group and the electron-accepting group (represented in the above formulae by the wavy lines).

Thus, for example, in various preferred embodiments, the first bridge (H) may have at least one more carbon-carbon double bonds within the bridge moiety than the bridge in the second and/or third nonlinear optical chromophores. More specifically, for example, where the first bridge (H) is represented by the formula IVa:

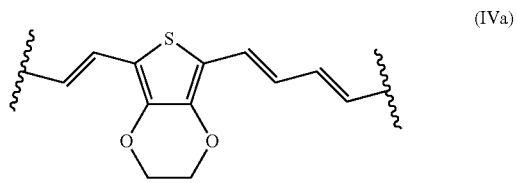 [SMILES: */C=C/C=C/c1sc(/C=C/*)c2c1OCCO2]

(IVa)

the bridge in the second and/or third nonlinear optical chromophore may be represented by the formula IVb:

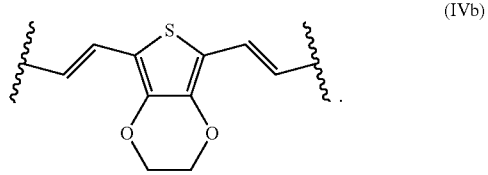 [SMILES: */C=C/c1sc(/C=C/*)c2c1OCCO2]

(IVb)

As a further example, an entire heterocyclic aromatic group can be removed, such that where the first bridge (II) is represented by the formula IVa, the bridge in the second and/or third nonlinear optical chromophore may be represented by the formula IVc:

(IVc)

Another example of a first nonlinear optical chromophore in accordance with an embodiment of the present invention is represented by Formula (V):

(V)

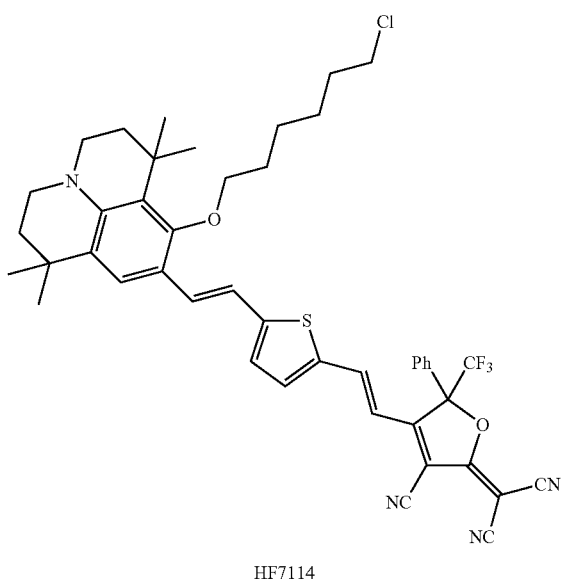

HF7114

Another example of a second nonlinear optical chromophore with a less conjugated bridge in accordance with an embodiment of the present invention is represented by Formula (Va):

(Va)

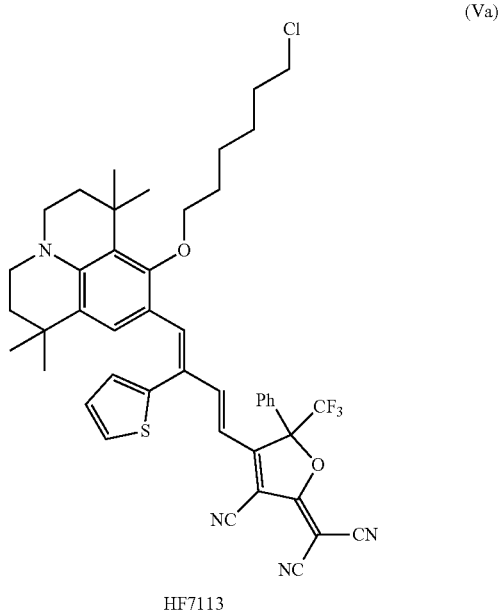 [SMILES: CC1(C)CCN2CCC(C)(C)c3c(OCCCCCCCl)c(/C=C(/C=C/C4=C(C#N)C(=C(C#N)C#N)OC4(c4ccccc4)C(F)(F)F)c4cccs4)cc1c32]

HF7113

Measured indices of refraction for the nonlinear optical chromophores of Formulae (V) and (Va) are set forth below in Table 1.

Figure 5:
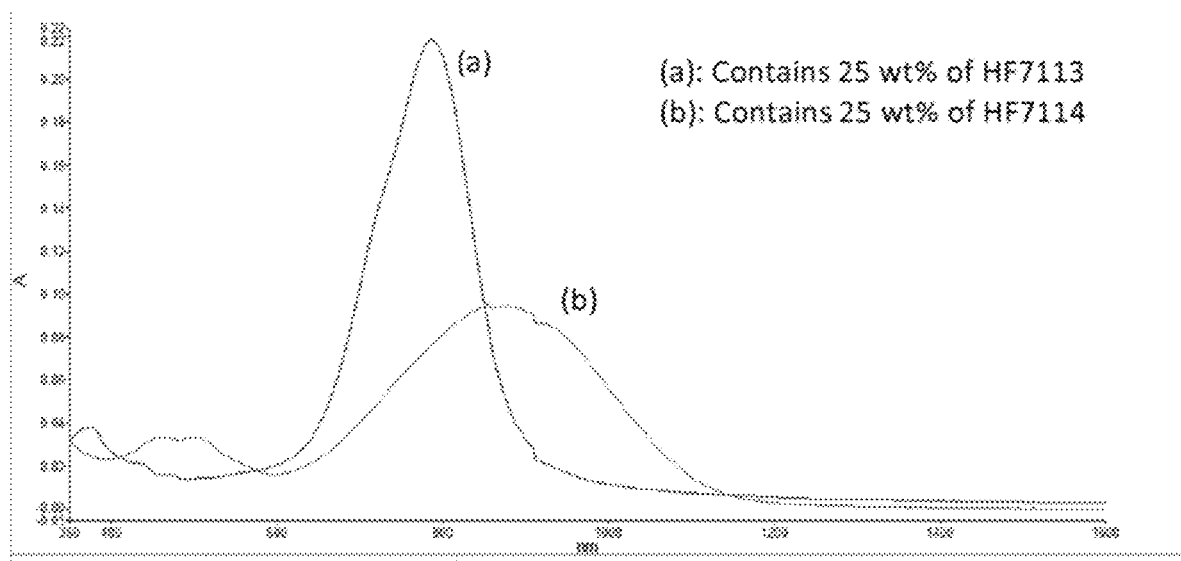
FIG. 5 is a graphical representation of the calibrated absorption spectra of two nonlinear optical chromophores in accordance with another embodiment of the present invention.

Referring to FIG. 5, the absorption spectra of the chromophores of Formulae (V) and (Va) are graphically depicted.

Suitable host polymers into which a nonlinear optical chromophore according to any of the various embodiments of the invention may be incorporated include amorphous polymers, such as, for example: polyetherimides (PEI); poly(methylmethacrylate)s (PMMA); polyimides; polyamic acid; polystyrenes; poly(urethane)s (PU); and amorphous polycarbonates (APC). In various preferred embodiments the host polymer comprises a polyetherimide. Preferred amorphous host polymers have high Tg values, low optical loss and good adhesion. The nonlinear optical chromophores are generally incorporated within the host polymer at a loading of 1% to 99% by weight, based on the entire nonlinear optical material, more preferably at a loading of 5% to 50% by weight.

The first-order hyperpolarizability ($\beta$) is one of the most common and useful NLO properties. Higher-order hyperpolarizabilities are useful in other applications such as all-optical (light-switching-light) applications. To determine if and to what extent a material, such as a core material or a cladding, includes a nonlinear optical chromophore with first-order hyperpolar character, the following test may be performed. First, the material in the form of a thin film is placed in an electric field to align the dipoles. This may be performed by sandwiching a film of the material between electrodes, such as indium tin oxide (ITO) substrates, gold films, or silver films, for example.

To generate a poling electric field, an electric potential is then applied to the electrodes while the material is heated to near its glass transition ($T_g$) temperature. After a suitable period of time, the temperature is gradually lowered while maintaining the poling electric field. Alternatively, the material can be poled by corona poling method, where an electrically charged needle at a suitable distance from the material film provides the poling electric field. In either instance, the dipoles in the material tend to align with the field.

The nonlinear optical property of the poled material is then tested as follows. Polarized light, often from a laser, is passed through the poled material, then through a polarizing filter, and to a light intensity detector. If the intensity of light received at the detector changes as the electric potential applied to the electrodes is varied, the material incorporates a nonlinear optic chromophore and has an electro-optically variable refractive index. A more detailed discussion of techniques to measure the electro-optic constants of a poled film that incorporates nonlinear optic chromophores may be found in Chia-Chi Teng, Measuring Electro-Optic Constants of a Poled Film, in Nonlinear Optics of Organic Molecules and Polymers, Chp. 7, 447-49 (Hari Singh Nalwa & Seizo Miyata eds., 1997), herein incorporated by reference in its entirety.

The relationship between the change in applied electric potential versus the change in the refractive index of the

TABLE 1

| Sample | Layers | Substrate | n_TM (1309 nm) | n_TM (1548 nm) | Thickness (μm) |
|---|---|---|---|---|---|
| MTSi-7 | HF7113 (25.1%)-APC150 | Si/SiO2(2.0 um), 4" | 1.6376 | 1.6247 | 2.022 |
| MTSi-8 | HF7114 (25.1%)-APC150 | Si/SiO2(2.0 um), 4" | 1.6639 | 1.6406 | 2.141 | material may be represented as its EO coefficient $r_{33}$. This effect is commonly referred to as an electro-optic, or EO, effect.

Figure 4:
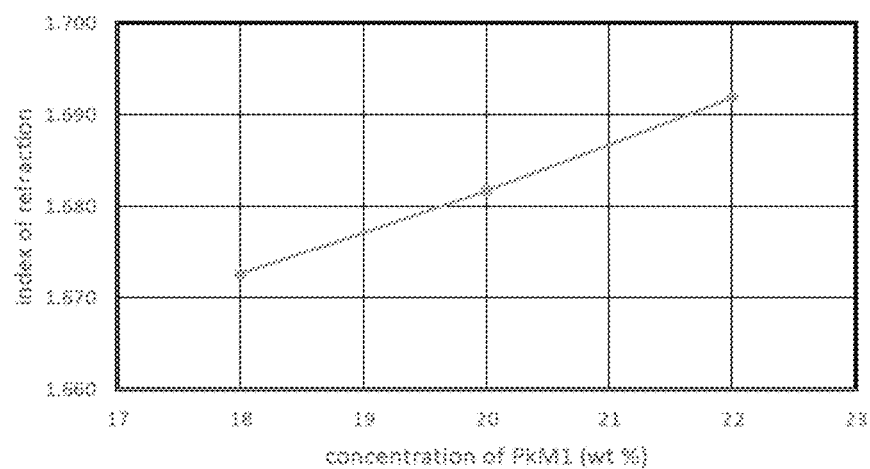
FIG. 4 is a graphical representation of the index of refraction of a cladding material in accordance with an embodiment of the present invention as a function of the concentration of nonlinear optical chromophore in the host polymer.

The second-order hyperpolarizability ($\gamma$) or third-order susceptibility ($\chi^{(3)}$), are the normal measures of third-order NLO activity. While there are several methods used to measure these properties, degenerate four-wave mixing (DFWM) is very common. See C. W. Thiel, "For-wave Mixing and Its Applications," http://www.physics.montana.edu.students.thiel.docs/FWMixing.pdf, the entire contents of which are hereby incorporated herein by reference. Referring to Published U.S. Patent Application No. US 2012/0267583A1, the entire contents of which are incorporated herein by reference, a method of evaluating third-order NLO properties of thin films, known in the art as Degenerate Four Wave Mixing (DFWM), can be used. In FIG. 4 of US 2012/0267583A1, Beams 1 and 2 are picosecond, coherent pulses, absorbed by the NLO film deposited on a glass substrate. Beam 3 is a weaker, slightly delayed beam at the same wavelength as Beams 1 and 2. Beam 4 is the resulting product of the wave mixing, diffracted off of the transient holographic grating, produced by interferences of beams 1 and 2 in the NLO material of the film. Beam 3 can be a "control" beam at a telecom wavelength which produces a "signal" beam at a frequency not absorbed by the NLO material. Optical properties and stability of nonlinear optical chromophores in accordance with the various embodiments of the present invention can be measured, for example, as described in US 2012/0267583A1.

Nonlinear optical chromophores in accordance with the various preferred embodiments of the present invention can be synthesized using commercially available reagents and reactions, as described below. Synthetic routes for other suitable nonlinear optical chromophores are described within the references previously incorporated herein, and are known to those of ordinary skill in the art.

For example, 3,4-ethylenedioxythiophene and (4-(diethylamino)phenyl) methanol can each be obtained commercially from Sigma-Aldrich, or synthesized by methods known in the art. In a first preliminary step, a phosphonium salt ylide of an electron-donating group is formed. For example, an electron-donating group precursor, such as (4-(diethylamino)phenyl)methanol, can be reacted with triphenylphosphine in the presence of acetic acid and hyrdobromic or hydroiodic acid in a solvent such as dichloromethane to form N,N-diethylaniline-4-methylenephosphonium bromide or iodide.

In a second preliminary step, an aldehyde of a thiophene bridging group is formed. For example, a thiophene bridging group, such as 3,4-ethylenedioxythiophene, is reacted with dimethylformamide in the presence of phosphoryl chloride to form 3,4-ethylenedioxythiophene-2-aldehyde.

Next, using a Wittig reaction, the thiophene bridging group aldehyde derivative can be reacted with the phosphonium salt ylide to form an alkene adduct thereof. For example, 3,4-ethylenedioxythiophene-2-aldehyde can be reacted with N,N-diethylaniline-4-methylenephosphonium bromide the resulting alkene (A):

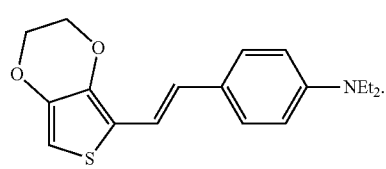

The alkene adduct (A) can then be reacted with n-butyl lithium in tetrahydrofuran, followed by reaction with an acrolein such as 3-(N,N-dimethylamino)acrolein to form intermediate (B):

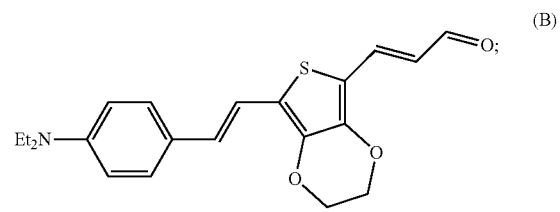

or alternatively reacted with dimethylformamide in the presence of phosphoryl chloride to form intermediate (C):

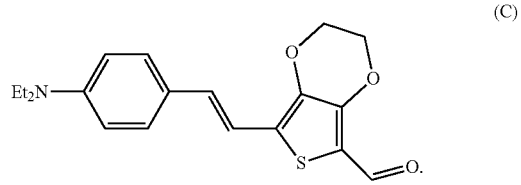

The thiophene bridging group/electron-donating group adduct aldehyde, e.g., intermediate (B) or intermediate (C), can then be reacted with an electron-accepting group, for example, via a Knoevenagel reaction, to replace the aldehyde with a carbon-carbon double bond linking the adduct to the electron accepting group.

Various embodiments of the present invention also include methods preparing cladding materials for electro-optic devices, which methods comprise: (a) selecting a first nonlinear optical chromophore of the general formula (I):

$$D\text{-}\Pi\text{-}A \qquad (I)$$

as previously described; and dispersing a first amount of the first nonlinear optical chromophore in a first host polymer to form an electro-optic core material. Methods in accordance with various embodiments of the invention then include (b) measuring an index of refraction of the electro-optic core material, and measuring a conductivity of the electro-optic core material at a poling temperature. Indices of refraction can be measured by various known techniques, including, for example, by using an optical system based on prism-coupling, such as described in R. Ulrich and R. Torge, "Measurement of Thin Film Parameters with a Prism Coupler," APPLIED OPTICS, Vol. 12, No 12, 2901-2908. Conductivities of polymer films can be determined by measuring current across the film sandwiched between a ground electrode and a top electrode under a bias. The bias is set so that the electric field is the same as the poling field.

Suitable poling temperatures are dependent upon the host polymer chosen and the concentration of the chromophore, and are generally determined by monitoring heat flow as a function of temperature using differential scanning calorimertry for temperature profile. For example, when using various polyetherimides, a suitable poling temperature is from 185° C. to 210° C.

In various embodiments according to the present invention, methods next include (c) selecting a second nonlinear optical chromophore of the general formula (II):

$$D'\text{-}\Pi'\text{-}A' \qquad (II)$$

as previously described, (d) dispersing a second amount of the second nonlinear optical chromophore in a second host polymer to form an initial cladding material such that the second nonlinear optical chromophore is present in the second host polymer at the same concentration as the first nonlinear optical chromophore in the first host polymer, and (e) measuring an index of refraction of the initial cladding material and a conductivity of the initial cladding material at the poling temperature. Next, the methods include (f) confirming that the index of refraction of the initial cladding material is lower than the index of refraction of the electro-optic core material. Preferably, for single mode applications, the index of refraction of the initial cladding material is lower than the index of refraction of the electro-optic core material by an amount of from about 0.01 to about 0.08.

Finally, various embodiments of methods in accordance with the present invention include (g) adjusting the concentration of the second nonlinear optical chromophore in the second host polymer to form a final cladding material having a conductivity equal to or greater than the conductivity of the electro-optic core material at the poling temperature.

In various preferred embodiments of the methods according to the present invention, the absorption spectrum of the materials are measured at the wavelengths of interest, for example, 0.8 m to about 2.0 m. Such preferred methods include verifying that the initial cladding material has a blue-shifted absorption spectrum as compared to the absorption spectrum of the core material. Optical loss of the cladding material is lower when the spectrum is blue-shifted in comparison to the core material. Thus, in various preferred embodiments of the present invention, the cladding, both the upper and/or lower cladding, has a blue-shifted absorption spectrum compared to that of the core material.

Various embodiments of the invention will now be described in further detail with reference to the following non-limiting examples.

EXAMPLES

Example 1: Synthesis of a non-linear optical chromophore in accordance with an embodiment of the invention:

Step 1): A round bottom flask was charged with N,N-diethylaniline (29.8 mL), triphenylphosphine (29.8 g), potassium iodide (31.2 g), chloroform (940 mL), acetic acid (37.6 mL) and formaldehyde (37% aqueous, 36.6 mL). The reaction was stirred at 50° C. for 60 hours under nitrogen. After cooling, the phases were separated, the organic portion was evaporated and the residue crystallized from ethanol providing N,N-diethylaniline-4-methylenephosphomiun iodide in 74% yield, 92% pure.

Step 2): A round bottom flask was charged with dichloromethane (600 mL), N,N-dimethylformamide (10.4 mL) and phosphoryl chloride (12.6 mL). The reaction was stirred under $N_2$ for 1 hour. 3,4-ethylenedioxythiophene (17.5 g) was added and stirring continued for 24 hours. Aqueous sodium hydroxide (1N, 100 mL) was added and the reaction was stirred overnight. The phases were separated, dichloromethane dried with magnesium sulfate and evaporated. The resulting solid was dissolved in hot ethyl acetate, set aside to cool then filtered providing 3,4-ethylenedioxythiophene-2-aldehyde as yellow needles, 27.7 g, 98% yield, 98% pure.

Step 3): A round bottom flask was charged with 3,4-ethylenedioxythiophene-2-aldehyde (8.91 g), N,N-diethylaniline-4-methylenephosphomiun iodide (27.9 g), dichloromethane (255 mL) and sodium hydroxide (50% aqueous, 51 mL). The reaction was vigorously stirred overnight. The phases where separated, the dichloromethane solution was dried with magnesium sulfate then evaporated giving a honey colored syrup. The syrup crystallized upon setting. The mixture was triturated in ether and filtered removing 85% of the triphenylphosphine oxide. The filtrate was evaporated and the residue chromatographed on silica gel eluting with hexane/ethyl acetate (3:1). The appropriate fractions were combined and evaporated giving (E)-4-(2-(2, 3-dihydrothieno[3,4-b][1,4]dioxin-5-yl)vinyl)-N,Ndiethyl-benzenamine as a thick yellow syrup which crystalized upon setting, 14.1 g, 95% yield, 96% pure.

Step 4): (E)-3-(7-((E)-4-(diethylamino)styryl)-2,3-dihydrothieno[3,4-b][1,4]dioxin-5-yl)acrylaldehyde: A round bottom flask was charged with (E)-4-(2-(2,3-dihydrothieno [3,4-b][1,4]dioxin-5-yl)vinyl)-N,Ndiethylbenzenamine (2.28 g) and THF (20 mL). The mixture was chilled to −70° C. then n-Butyl lithium (2.5N in hexane, 3.5 mL) was added and the reaction was stirred at 0° C. for 30 minutes. The 3-(N,Ndimethylamino) acrolein (1.0 mL) was added and the reaction was stirred another 30 minutes at 0° C. The still cold reaction was quenched with water, diluted with ethyl acetate, washed with brine, dried with magnesium sulfate and evaporated. The residue was chromatographed with ethyl acetate/hexane (1:3-1:2). The appropriate fractions were combined and evaporated giving (E)-3-(7-((E)-4-(diethylamino) styryl)-2,3-dihydrothieno[3,4-b][1,4]dioxin-5-yl)acrylaldehyde as a red powder, 2.10 g, 74% yield, cis to trans ratio 1:9, 91% pure.

Step 5): 3-(3,4-dichlorophenyl)-3-hydroxybutan-2-one: A dried round bottom flask was evacuated and filled with nitrogen three times then charged with 2,3-butanedione (4.38 mL) and tetrahydrofuran (250 mL). While under nitrogen the solution was chilled to 0° C. then 3,4-dichlorophenylmagnesium bromide (0.5 N in tetrahydrofuran, 50 mL) was added in a steady stream by cannula using nitrogen pressure. The ice bath was removed and the reaction was stirred under nitrogen for 1 hour. The reaction was quenched with saturated ammonium chloride, diluted with ethyl acetate, washed with water then brine, dried with magnesium sulfate and evaporated giving 3-(3,4-dichlorophenyl)-3-hydroxybutan-2-one as a thick syrup. The crude product was used without purification.

Step 6): A dry round bottom flask was charged with 3-(3,4-dichlorophenyl)-3-hydroxybutan-2-one (5.80 g), malononitrile (3.30 g) then the flask was evacuated and charged with nitrogen three times. Anhydrous ethanol (65 mL) was added then lithium ethoxide (1N in ethanol, 2.5 mL) was added. A Soxhlet extractor, with a thimble filled with molecular sieves, was added and the reaction was refluxed under nitrogen overnight. After 24 hours the reaction was allowed to cool, neutralized with 1N hydrochloric acid to a pH of ~6,diluted with ethyl acetate, washed with water then brine, dried with magnesium sulfate and evaporated giving a thick paste. Chromatography (silica gel, CHCl3) gave a light yellow powder. The powder was refluxed in ethanol, allowed to cool, filtered, washed with ethanol and dried giving 3-cyano-2-(dicyanomethylene)-4, 5-dimethyl-5-(3,4-dichlorophenyl)-2,5-dihydrofuran as a yellow powder, 4.80 g, 52% yield (for two steps, 5 & 6), 94% pure.

Step 7): A round bottom flask was charged with (E)-3-(7-((E)-4-(diethylamino)styryl)-2,3-dihydrothieno[3,4-b][1, 4]dioxin-5-yl)acrylaldehyde (3.43 g), 3-Cyano-2-(dicyanomethylene)-4,5-dimethyl-5-(3,4-dichlorophenyl)-2,5-dihydrofuran (3.62 g), tetrahydrofuran (40 mL), ethanol (10 mL) and piperidine (0.2 mL). The reaction was stirred at 80° C. for 24 hours. The reaction was evaporated. The residue was chromatographed on silica gel eluting with dichloromethane. The appropriate fractions were combined and evaporated. The residue was re-chromatographed on silica gel eluting with hexane/ethyl acetate. The cleanest fractions were combined and evaporated. The residue was dissolved in dichloromethane and crystallized by evaporation. The crystals were soaked in ether overnight. The ether was decanted off and fresh ether added, daily, for four more days. Fresh ether was added, again, followed by trituration, filtration, wash with ether and drying gave 3-cyano-2-(dicyanomethylene)-4-((1E,3E)-4-(7-((E)-4-(diethylamino)styryl)-2,3-dihydrothieno[3,4-b][1,4]dioxin-5-yl)buta-1,3-dienyl))-5-methyl-5-(3,4-dichlorophenyl)-2,5-dihydrofuran (I″) as very fine copper colored crystals, 1.44 g, 22% yield, 100% trans, 99% pure.

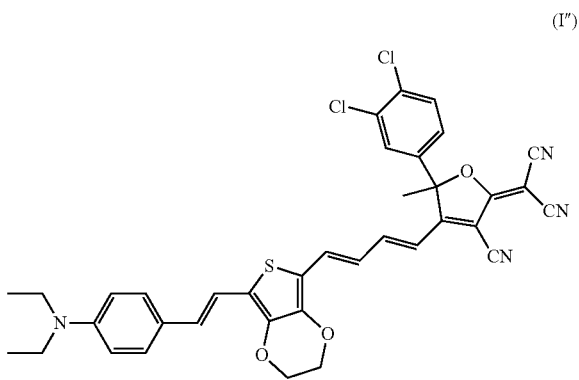 [SMILES: CCN(CC)c1ccc(/C=C/c2sc(/C=C/C=C/C3=C(C#N)C(=C(C#N)C#N)OC3(C)c3ccc(Cl)c(Cl)c3)c3c2OCCO3)cc1]

(I″)

Example 2: Synthesis of a non-linear optical chromophore with a less conjugated bridge (M1) in accordance with an embodiment of the invention:

Step 1):

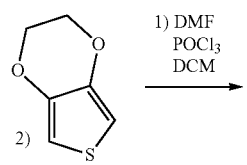

N,N-diethylaniline-4-methylenephosphomiun bromide: A round bottom flask was charged with N,N-diethylaniline (29.8 mL), triphenylphosphine (29.8 g), potassium iodide (31.2 g), chloroform (940 mL), acetic acid (37.6 mL) and formaldehyde (37% aqueous, 36.6 mL). The reaction was stirred at 50° C. for 60 hours under nitrogen. After cooling, the phases were separated, the organic portion was evaporated and the residue crystallized from ethanol providing the target compound in 74% yield, 92% pure.

Step 2):

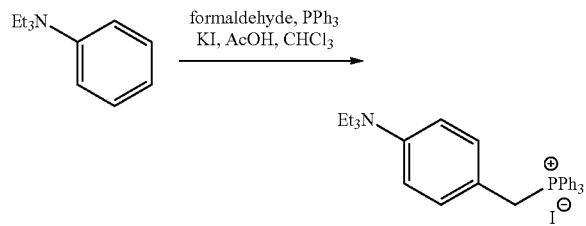

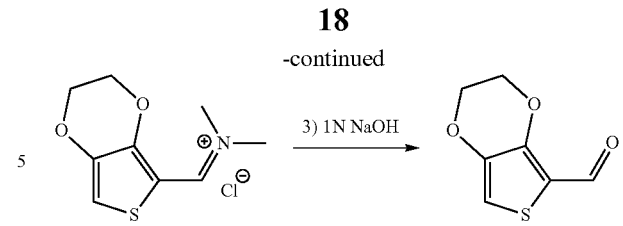

3,4-ethylenedioxythiophene-2-aldehyde: A round bottom flask was charged with dichloromethane (600 mL), N,N-dimethylformamide (10.4 mL) and phosphoryl chloride (12.6 mL). The reaction was stirred under $N_2$ for 1 hour. The 3,4-ethylenedioxythiophene (17.5 g) was added and stirring continued for 24 hours. The aqueous sodium hydroxide (1N, 100 mL) was added and the reaction was stirred overnight. The phases were separated, dichloromethane dried with magnesium sulfate and evaporated. The resulting solid was dissolved in hot ethyl acetate, set aside to cool then filtered providing the target compound as yellow needles, 27.7 g, 98% yield, 98% pure.

Step 3):

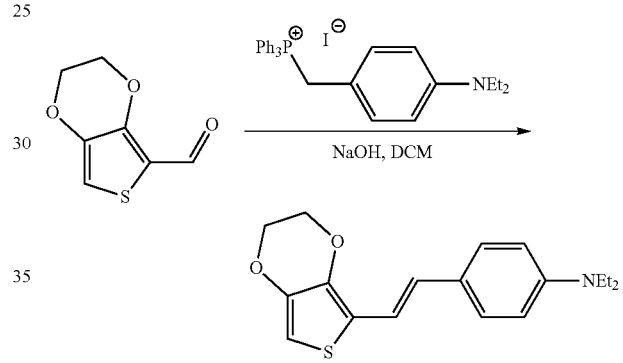

(E)-4-(2-(2,3-dihydrothieno[3,4-b][1,4]dioxin-5-yl)vinyl)-N,N-diethylbenzenamine: A round bottom flask was charged with 3,4-ethylenedioxythiophene-2-aldehyde (8.91 g), N,N-diethylaniline-4-methylenephosphomiun bromide (27.9 g), dichloromethane (255 mL) and sodium hydroxide (50%, aqueous, 51 mL). The reaction was vigorously stirred overnight. The phases where separated, the dichloromethane solution was dried with magnesium sulfate then evaporated giving a honey colored syrup. The syrup crystallized upon setting. The mixture was triturated in ether and filtered removing 85% of the triphenylphosphine oxide. The filtrate was evaporated and the residue chromatographed on silica gel eluting with hexane/ethyl acetate (3:1). The appropriate fractions were combined and evaporated giving a thick yellow syrup the crystalized upon setting, 14.1 g, 95% yield, 96% pure.

Step 4):

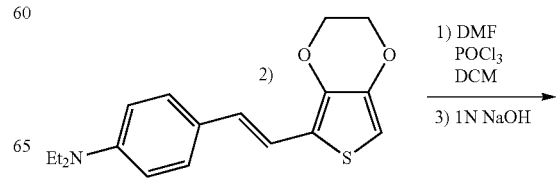

-continued

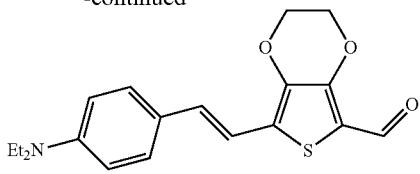

(E)-7-(4-(diethylamino)styryl)-2,3-dihydrothieno[3,4-b][1,4]dioxine-5-carbaldehyde: A round bottom flask was charged with dichloromethane (1 L), N,N-dimethylformamide (12.7 mL) and phosphoryl chloride (15.4 mL). The reaction was stirred under nitrogen for 1 hour. The (E)-4-(2-(2,3-dihydrothieno[3,4-b][1,4]dioxin-5-yl)vinyl)-N,N-diethylbenzenamine (47.3 g) was added and stirring continued for 24 hours. LCMS indicated complete conversion to the iminium salt. The 1N aqueous sodium hydroxide (300 mL) was added and the reaction was stirred overnight. The phases were separated, dichloromethane dried with magnesium sulfate and evaporated. The resulting solid was dissolved in hot ethyl acetate, set aside to cool and filtered providing the target compound as red/orange needles, 49.4 g, 96% yield, 97% pure.

Step 5):

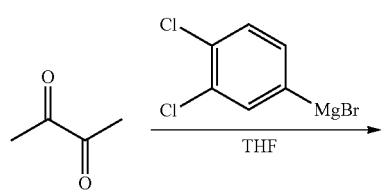

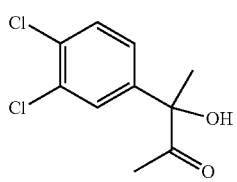

3-(3,4-dichlorophenyl)-3-hydroxybutan-2-one: A dried round bottom flask was evacuated and filled with nitrogen three times then charged with 2,3-butanedione (4.38 mL) and tetrahydrofuran (250 mL). While under nitrogen the solution was chilled to 0° C. then 3,4-dichlorophenylmagnesium bromide (0.5 N in tetrahydrofuran, 50 mL) was added in a steady stream by cannula using nitrogen pressure. The ice bath was removed and the reaction was stirred under nitrogen for 1 hour. The reaction was quenched with saturated ammonium chloride, diluted with ethyl acetate, washed with water then brine, dried with magnesium sulfate and evaporated giving a thick syrup. The crude product was used without purification.

Step 6):

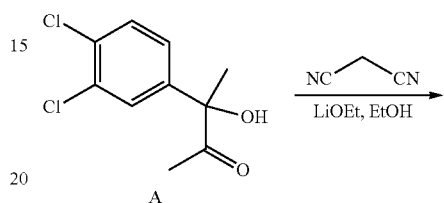

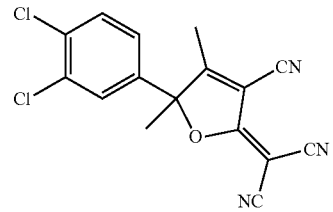

3-Cyano-2-(dicyanomethylene)-4,5-dimethyl-5-(3,4-dichlorophenyl)-2,5-dihydrofuran: A dry round bottom flask was charged with 3-(3,4-dichlorophenyl)-3-hydroxybutan-2-one (5.80 g), malononitrile (3.30 g) then the flask was evacuated and charged with nitrogen three times. Anhydrous ethanol (65 mL) was added then lithium ethoxide (1N in ethanol, 2.5 mL) was added. A Soxhlet extractor, with a thimble filled with molecular sieves, was added and the reaction was refluxed under nitrogen overnight. After 24 hours the reaction was allowed to cool, neutralized with 1N hydrochloric acid to a pH of ~6, diluted with ethyl acetate, washed with water then brine, dried with magnesium sulfate and evaporated giving a thick paste. Chromatography (silica gel, CHCl$_3$) gave a light yellow powder. The powder was refluxed in ethanol, allowed to cool, filtered, washed with ethanol and dried giving the desired furan derivative as a yellow powder, 4.80 g, 52% yield (for two steps, 5 & 6), 94% pure.

Step 7):

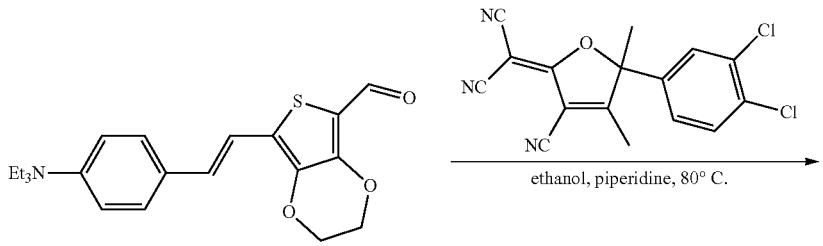

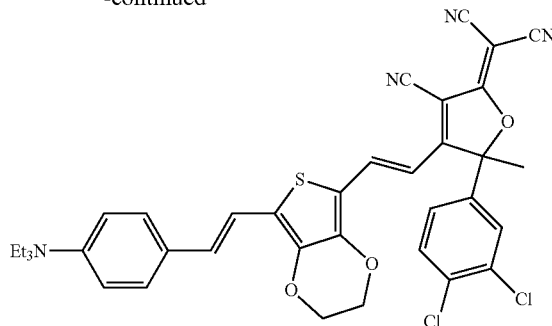

2-[3-cyano-5-(3,4-dichlorophenyl)-4-[(E)-2-[7-[(E)-2-[4-(diethylamino)phenyl]vinyl]-2,3-dihydrothieno[3,4-b][1,4]dioxin-5-yl]vinyl]-5-methyl-2-furylidene]propanedinitrile (PKM1): A round bottom flask was charged with (E)-3-(7-((E)-4-(diethylamino)styryl)-2,3-dihydrothieno[3,4-b][1,4]dioxin-5-yl)acrylaldehyde (1.30 g), 3-Cyano-2-(dicyanomethylene)-4,5-dimethyl-5-(3,4-dichlorophenyl)-2,5-dihydrofuran (1.24 g), ethanol (150 mL) and piperidine (31 mg). The reaction was stirred at 80° C. for 20 hours. The reaction was evaporated. The residue was chromatographed on silica gel eluting with hexane/ethyl acetate. The cleanest fractions were combined and evaporated. The residue was crystallized from ethanol giving the product as very fine coppery powder, 1.69 g, 68% yield, 100% trans, 97% pure.

Example 3: Synthesis of a non-linear optical chromophore with a less conjugated bridge (M0) in accordance with an embodiment of the invention:

Step 1):

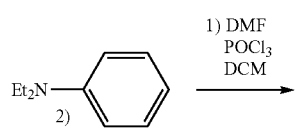

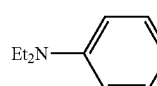

N,N-diethyl(4)aniline aldehyde: A round bottom flask was charged with dichloromethane (600 mL), N,N-dimethylformamide (10.4 mL) and phosphoryl chloride (12.6 mL). The reaction was stirred under N₂ for 1 hour. The N,N-diethylaniline (17.5 g) was added and stirring continued for 24 hours. LCMS indicated complete conversion to the iminium salt. The aqueous sodium hydroxide (1N, 100 mL) was added and the reaction was stirred overnight. The phases were separated, dichloromethane dried with magnesium sulfate and evaporated. The resulting oil was dissolved in ether, filtered through Celite and evaporated providing the target compound as yellow oil, 27.7 g, 98% yield, 98% pure.

Step 2):

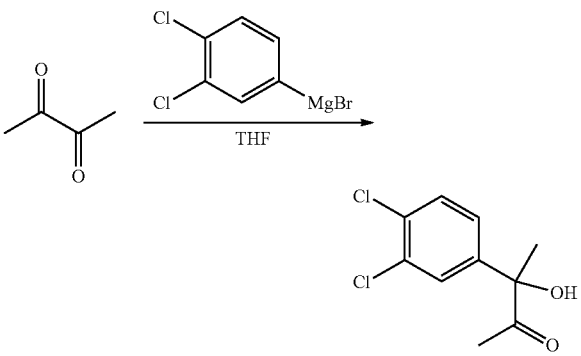

3-(3,4-dichlorophenyl)-3-hydroxybutan-2-one: A dried round bottom flask was evacuated and filled with nitrogen three times then charged with 2,3-butanedione (4.38 mL) and tetrahydrofuran (250 mL). While under nitrogen the solution was chilled to 0° C. then 3,4-dichlorophenylmagnesium bromide (0.5 N in tetrahydrofuran, 50 mL) was added in a steady stream by cannula using nitrogen pressure. The ice bath was removed and the reaction was stirred under nitrogen for 1 hour. The reaction was quenched with saturated ammonium chloride, diluted with ethyl acetate, washed with water then brine, dried with magnesium sulfate and evaporated giving a thick syrup. The crude product was used without purification.

Step 3):

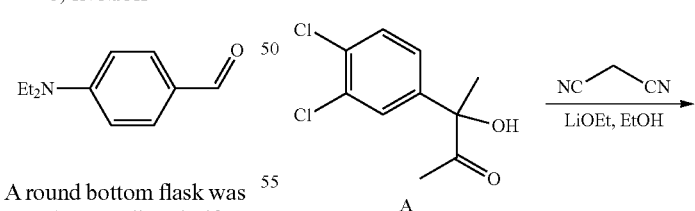

3-Cyano-2-(dicyanomethylene)-4,5-dimethyl-5-(3,4-dichlorophenyl)-2,5-dihydrofuran: A dry round bottom flask was charged with 3-(3,4-dichlorophenyl)-3-hydroxybutan-2-one (5.80 g), malononitrile (3.30 g) then the flask was evacuated and charged with nitrogen three times. Anhydrous ethanol (65 mL) was added then lithium ethoxide (1N in ethanol, 2.5 mL) was added. A Soxhlet extractor, with a thimble filled with molecular sieves, was added and the reaction was refluxed under nitrogen overnight. After 24 hours the reaction was allowed to cool, neutralized with 1N hydrochloric acid to a pH of ~6, diluted with ethyl acetate, washed with water then brine, dried with magnesium sulfate and evaporated giving a thick paste. Chromatography (silica gel, $CHCl_3$) gave a light yellow powder. The powder was refluxed in ethanol, allowed to cool, filtered, washed with ethanol and dried giving the desired furan derivative as a yellow powder, 4.80 g, 52% yield (for two steps, 5 & 6), 94% pure.

Step 4):

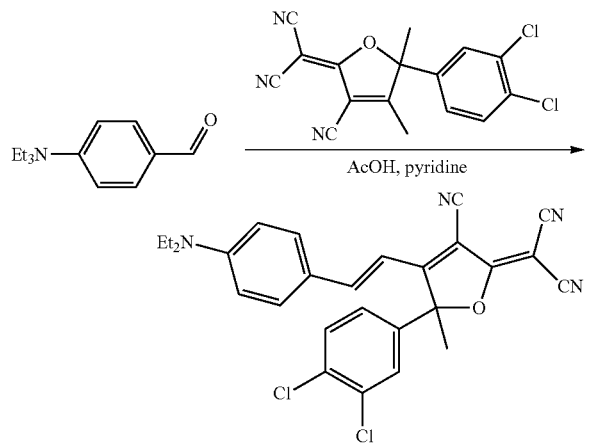

2-[3-cyano-5-(3,4-dichlorophenyl)-4-[(E)-2-[4-(diethylamino)phenyl]vinyl]-5-methyl-2-furylidene]propanedinitrile (PKM0): A round bottom flask was charged with 4-(diethylamino)benzaldehyde (44 mg), 3-Cyano-2-(dicyanomethylene)-4,5-dimethyl-5-(3,4-dichlorophenyl)-2,5-dihydrofuran (82 mg), pyridine (2.5 mL) and acetic acid (10 μg). The reaction was stirred for 3 days. The reaction was evaporated. The residue was chromatographed on silica gel eluting with hexane/DCM (20%). The cleanest fractions were combined and evaporated. The residue was crystallized from DCM giving the product as very fine golden powder, 24 mg, 77% yield, 98% pure.

Figure 2:
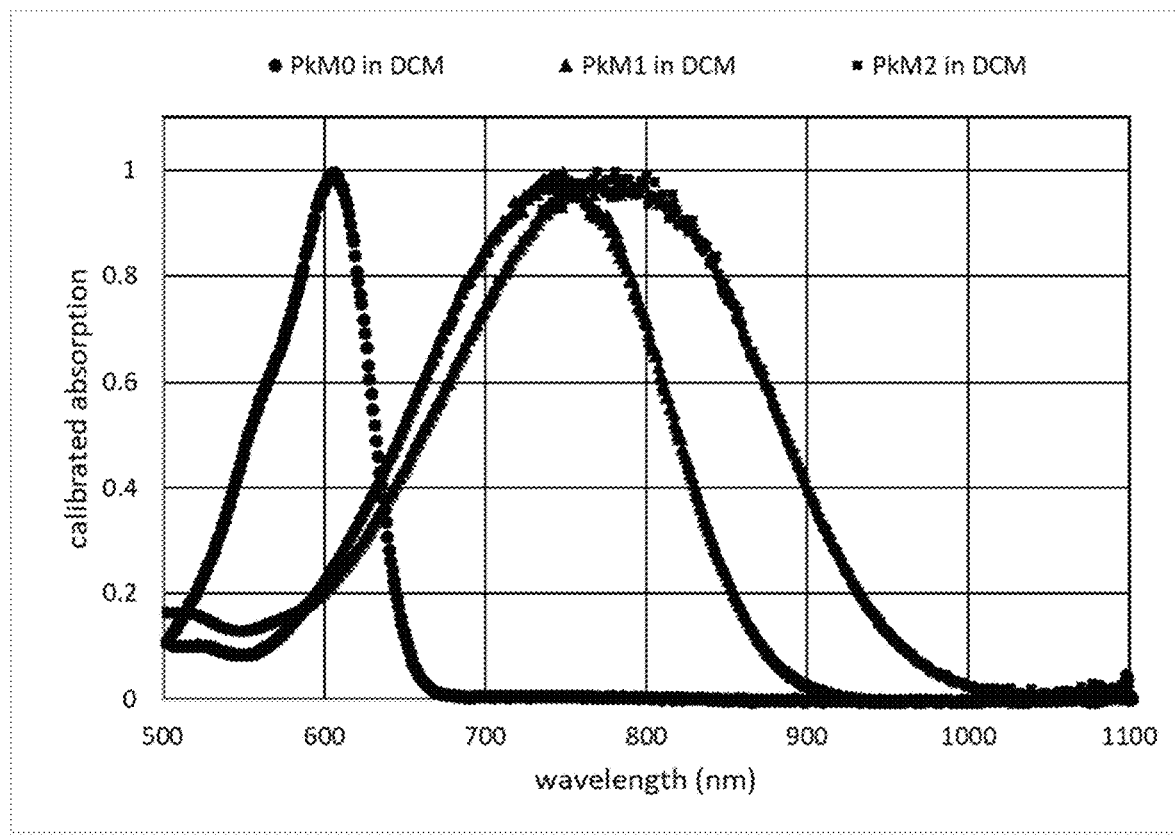
FIG. 2 is a graphical representation of the calibrated absorption spectra of three nonlinear optical chromophores in accordance with one embodiment of the present invention.

Example 4: Measurement of the absorption spectra of the nonlinear optical chromophores prepared in Examples 1, 2 and 3:

Referring to FIG. 2, the absorption spectra for the nonlinear optical chromophores prepared in examples 1, 2 and 3 are depicted graphically. As can be seen from FIG. 2, the nonlinear optical chromophores having a less conjugated bridge have blue-shifted absorption spectra. The spectra were taken from dilute solution of the chromophores in dichloromethane using a Cary 50 UV-Vis spectrometer was used for the measurements.

Example 5: Preparation of core material and cladding materials incorporating the nonlinear optical chromophores prepared in Examples 1, 2 and 3:

Each of the nonlinear optical chromophores prepared in examples 1, 2 and 3 was combined with Ultem® 1000P polyetherimide and approximately 1.4 wt % of dichloromethane and 1,2,3-trichloropropane mixture (1:4 by volume) in varying nonlinear optical chromophore concentrations to form solutions of the materials. The nonlinear optical chromophore of Example 1 was prepared as a single 22.5 wt % solution, based on solids. The nonlinear optical chromophore of Example 2 was prepared as three solutions of 23%, 20% and 18% concentrations. The nonlinear optical chromophore of Example 3 was prepared as a single 24.4% solution.

Example 6: Measurement of indices of refraction, optical loss, and conductivities of core material and cladding materials prepared in Example 5:

The index of refraction and optical loss (at 1309 nm and at 1548 nm) as well as the conductivity of each of the materials prepared in Example 5 were measured as described previously herein. The optical loss was measured by using a system prism-coupling a laser beam as described previously herein into a polymer coating on a silicon wafer with an oxide layer of about 2.5 μm. The intensity of scattered light as the beam propagated through the coating was recorded by scanning a bundle of optical fiber along the propagation of the beam above the coating. The decay of the scattered light was fit to an exponential curve to calculate the loss of the beam. The measured values are set forth below in Table 2.

TABLE 2

| Coatings | 1309 nm | | 1548 nm | | Conductivity* (S/cm) |
| --- | --- | --- | --- | --- | --- |
| | n_TM | loss (dB/cm) | n_TM | loss (dB/cm) | |
| M2(22.5%)-Core | 1.729 | 8 | 1.701 | 2.2 | $1.3 \times 10^{-9}$ |
| M1(18.0%)-Cladding | 1.685 | 1.8 | 1.673 | N/A | $5.0 \times 10^{-9}$ |
| M0(24.4%)-Cladding | 1.685 | 1 | 1.676 | 1.4 | $1.1 \times 10^{-9}$ |

*At a standard poling temperature and field

Figure 3:
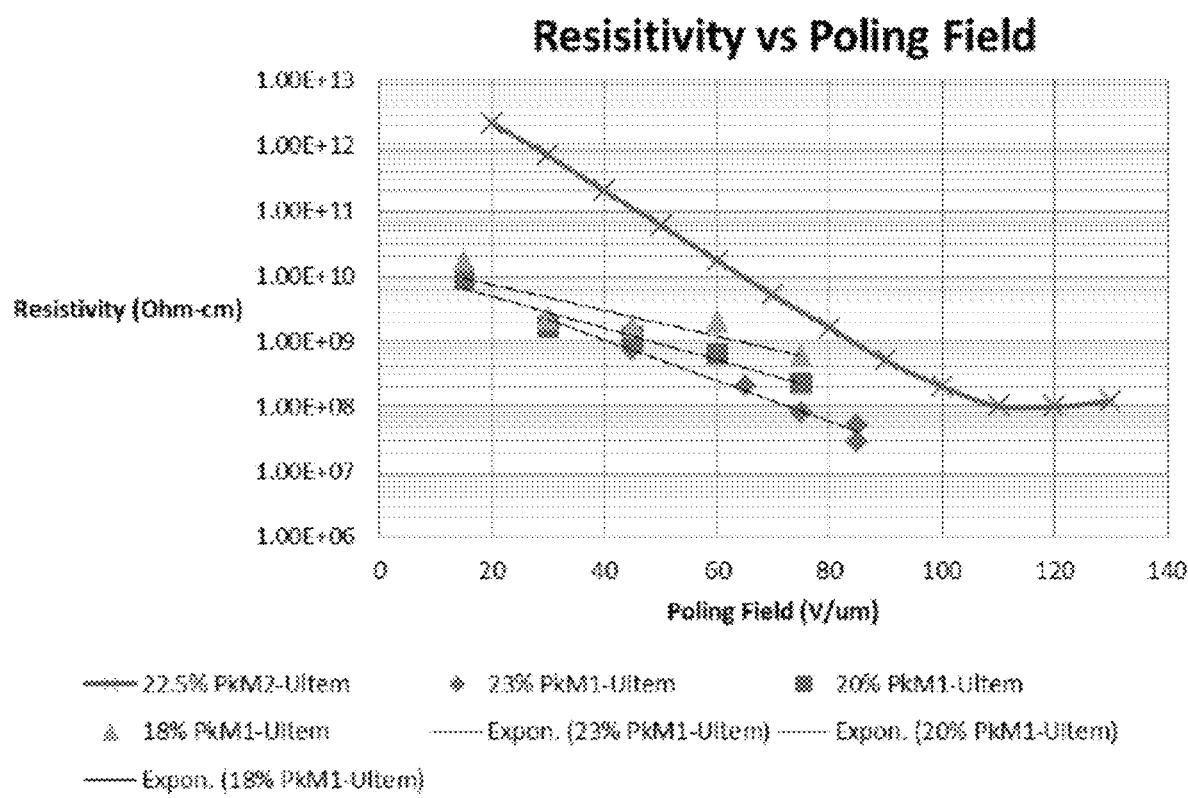
FIG. 3 is a graphical representation of resistivity as a function of poling field for an electro-optic core material and three cladding materials in accordance with an embodiment of the present invention.

Referring to FIG. 3, the resistivity of various materials from Example 6, sandwiched between an ITO coated glass and a gold top electrode placed on a hot plate set at a poling temperature of 197° C., is plotted against the poling field. As can be seen from FIG. 3, the resistivity of the chromophores with less conjugated bridges is lower and thus, their conductivity higher at all poling fields measured.

Referring to FIG. 4, the index of refraction of the three solutions of the nonlinear optical chromophore of Example 2 as measured in this example are plotted. As shown in FIG. 4, the index of refraction can be adjusted by adjusting the concentration of the nonlinear optical chromophore in the host polymer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An electro-optic device comprising: (i) an electro-optic polymer core comprising a first host polymer and a first nonlinear optical chromophore; and (ii) a cladding comprising a second host polymer and a second nonlinear optical chromophore; wherein the first nonlinear optical chromophore has a structure according to the general formula (I):

$$D-\Pi-A \qquad (I)$$

wherein D represents a first organic electron-donating group: A represents a first organic electron-accepting group having an electron affinity greater than the electron affinity of D; and Π represents a first bridge covalently bonded to A and D, wherein the first bridge comprises a 2-4 carbon diyl moiety, wherein the diyl moiety is arranged as the shortest path between the first electron-donating group and the first electron-accepting group;

wherein the second nonlinear optical chromophore has a structure according to the general formula (II):

$$D'\text{-}\Pi'\text{-}A' \qquad (II)$$

wherein D' represents a second organic electron-donating group; A' represents a second organic electron-accepting group having an electron affinity greater than the electron affinity of D'; and Π' represents a second bridge covalently bonded to A' and D'; and wherein the cladding has an index of refraction that is less than an index of refraction of the electro-optic polymer core, and wherein the second nonlinear optical chromophore is present in the second host polymer in a concentration such that the cladding has a conductivity equal to or greater than at least 10% of the conductivity of the electro-optic polymer core at a poling temperature:

wherein Π' is less conjugated than Π.

2. An electro-optic device comprising: (i) an electro-optic polymer core comprising a first host polymer and a first nonlinear optical chromophore; and (ii) claddings comprising an upper cladding and a lower cladding; wherein the electro-optic polymer core is disposed between the lower cladding and the upper cladding, wherein the lower cladding comprises a second host polymer and a second nonlinear optical chromophore and the upper cladding comprises a third host polymer and a third nonlinear optical chromophore; wherein the first nonlinear optical chromophore has a structure according to the general formula (I):

$$D\text{-}\Pi\text{-}A \qquad (I)$$

wherein D represents a first organic electron-donating group: A represents a first organic electron-accepting group having an electron affinity greater than the electron affinity of D; and Π represents a first bridge covalently bonded to A and D, wherein the first bridge comprises a 2-4 carbon diyl moiety, wherein the diyl moiety is arranged as the shortest path between the first electron-donating group and the first electron-accepting group:

wherein the second nonlinear optical chromophore has a structure according to the general formula (II):

$$D'\text{-}\Pi'\text{-}A' \qquad (II)$$

wherein D' represents a second organic electron-donating group: A' represents a second organic electron-accepting group having an electron affinity greater than the electron affinity of D'; and Π' represents a second bridge covalently bonded to A' and D'; and wherein the lower cladding has an index of refraction that is less than an index of refraction of the electro-optic polymer core, and wherein the second nonlinear optical chromophore is present in the second host polymer in a concentration such that the lower cladding has a conductivity equal to or greater than at least 10% of the conductivity of the electro-optic polymer core at a poling temperature:

wherein the third nonlinear optical chromophore has a structure according to the general formula (III):

$$D''\text{-}\Pi''\text{-}A'' \qquad (III)$$

wherein D" represents a third organic electron-donating group: A" represents a third organic electron-accepting group having an electron affinity greater than the electron affinity of D";

and Π" represents a third bridge covalently bonded to A" and D"; wherein the upper cladding has an index of refraction that is less than an index of refraction of the electro-optic polymer core, and wherein the third nonlinear optical chromophore is present in the third host polymer in a concentration such that the upper cladding has a conductivity equal to or greater than at least 10% of the conductivity of the electro-optic polymer core at the poling temperature:

wherein the first host polymer, the second host polymer and the third host polymer are the same;

wherein the lower cladding and the upper cladding each has a blue-shifted absorption spectrum as compared to the absorption spectrum of the electro-optic polymer core.

3. A method of preparing cladding materials for electro-optic devices, said method comprising:
(a) selecting a first nonlinear optical chromophore of the general formula (I):

$$D\text{-}\Pi\text{-}A \qquad (I)$$

wherein D represents a first organic electron-donating group; A represents a first organic electron-accepting group having an electron affinity greater than the electron affinity of D; and Π represents a first bridge covalently bonded to A and D, wherein the first bridge comprises a 2-4 carbon diyl moiety, wherein the diyl moiety is arranged as the shortest path between the first electron-donating group and the first electron-accepting group; and dispersing a first amount of the first nonlinear optical chromophore in a first host polymer to form an electro-optic core material;

(b) measuring an index of refraction of the electro-optic core material, and measuring a conductivity of the electro-optic core material at a poling temperature;

(c) selecting a second nonlinear optical chromophore of the general formula (II):

$$D'\text{-}\Pi'\text{-}A' \qquad (II)$$

wherein D' represents a second organic electron-donating group, A' represents a second organic electron-accepting group having an electron affinity greater than the electron affinity of D', and Π' represents a second bridge covalently bonded to A' and D' and wherein the second bridge is less conjugated than the first bridge;

(d) dispersing a second amount of the second nonlinear optical chromophore in a second host polymer to form an initial cladding material such that the second nonlinear optical chromophore is present in the second host polymer at the same concentration as the first nonlinear optical chromophore in the first host polymer;

(e) measuring an index of refraction of the initial cladding material and a conductivity of the initial cladding material at the poling temperature;

(f) confirming that the index of refraction of the initial cladding material is lower than the index of refraction of the electro-optic core material; and (g) adjusting the concentration of the second nonlinear optical chromophore in the second host polymer to form a final cladding material having a conductivity equal to or greater than at least 10% of the conductivity of the electro-optic polymer core material at the poling temperature.

4. The method according to claim 3, wherein the 2-4 carbon diyl moiety is unsubstituted or substituted.

5. The method according to claim 3, wherein D and D' are the same and wherein A and A' are the same.

6. The method according to claim 3, wherein Π and Π' are the same.

7. The method according to claim 6, wherein Π' is less conjugated than Π.

8. The method according to claim 3, wherein A and A' are different.

9. The method according to claim 3, wherein the first host polymer and the second host polymer are the same.

10. The method according to claim 9, wherein D and D' are the same and wherein A and A' are the same.

11. An electro-optic device comprising an electro-optic core material and a final cladding material prepared by the method according to claim 3.

* * * * *